(12) United States Patent
Steele et al.

(10) Patent No.: US 7,959,477 B2
(45) Date of Patent: Jun. 14, 2011

(54) CABLE TERMINATION CONNECTION ASSEMBLY

(75) Inventors: James Steele, Seattle, WA (US); William R. Stagi, Burien, WA (US)

(73) Assignee: UTILX Corporation, Kent, WA (US)

( * ) Notice: Subject to any disclaimer, the term of this patent is extended or adjusted under 35 U.S.C. 154(b) by 0 days.

(21) Appl. No.: 12/544,985

(22) Filed: Aug. 20, 2009

(65) Prior Publication Data

US 2010/0062628 A1    Mar. 11, 2010

Related U.S. Application Data

(60) Provisional application No. 61/090,557, filed on Aug. 20, 2008.

(51) Int. Cl.
*H01R 4/38* (2006.01)

(52) U.S. Cl. .......................................................... 439/805

(58) Field of Classification Search ................... 439/805, 439/203, 204, 936, 587, 199; 174/76
See application file for complete search history.

(56) References Cited

U.S. PATENT DOCUMENTS

| | | | | |
|---|---|---|---|---|
| 2,012,689 A * | 8/1935 | McFarlin | ............................ | 174/8 |
| 2,313,780 A * | 3/1943 | Snyder | ............................ | 285/116 |
| 2,331,615 A * | 10/1943 | Meyer | ............................ | 285/276 |
| 2,466,997 A * | 4/1949 | Morris | ............................ | 439/732 |
| 2,579,529 A * | 12/1951 | Woodling | ....................... | 285/341 |
| 2,581,500 A * | 1/1952 | Schoonmaker | ................ | 439/727 |
| 2,581,655 A * | 1/1952 | Harden | ........................... | 439/278 |
| 3,444,505 A * | 5/1969 | Becker | ............................ | 439/519 |
| 3,593,415 A * | 7/1971 | Wofford | ........................... | 29/870 |
| 3,810,078 A * | 5/1974 | Chordas | .......................... | 439/724 |
| 4,607,469 A * | 8/1986 | Harrison | ........................ | 52/220.8 |
| 4,752,252 A * | 6/1988 | Cherry et al. | ................ | 439/784 |
| 4,895,124 A * | 1/1990 | Bartholomew | ............... | 123/510 |
| 4,927,386 A | 5/1990 | Neuroth | | |
| 5,854,444 A * | 12/1998 | Fehlhaber | .................... | 174/84 R |
| 5,907,128 A * | 5/1999 | Lanan et al. | ................. | 174/74 R |
| 7,074,064 B2 * | 7/2006 | Wallace | ........................... | 439/190 |
| 7,344,396 B2 * | 3/2008 | Stagi et al. | .................... | 439/204 |
| 7,621,767 B2 * | 11/2009 | Stagi et al. | .................... | 439/204 |
| 7,658,629 B2 * | 2/2010 | Stagi et al. | .................... | 439/204 |
| 2002/0046865 A1 * | 4/2002 | Bertini et al. | ............... | 174/84 R |
| 2007/0049085 A1 * | 3/2007 | Stagi et al. | .................... | 439/199 |
| 2008/0124962 A1 * | 5/2008 | Stagi et al. | .................... | 439/199 |
| 2008/0156508 A1 * | 7/2008 | Stagi et al. | .................... | 174/15.6 |

* cited by examiner

*Primary Examiner* — T C Patel
*Assistant Examiner* — Vladimir Imas
(74) *Attorney, Agent, or Firm* — Christensen O'Connor Johnson Kindness PLLC

(57) ABSTRACT

A cable termination connection assembly for coupling a cable to an apparatus generally includes a main body defining an inner cavity having first and second ends, the main body configured to receive a pressurized fluid, and the first end configured to receive at least a portion of the cable therein, and a first engagement mechanism configured to couple the main body to the cable, wherein the first engagement mechanism includes a first adhesive seal.

22 Claims, 9 Drawing Sheets

CABLE TERMINATION CONNECTION ASSEMBLY

CROSS-REFERENCES TO RELATED APPLICATIONS

This application claims the benefit of U.S. Provisional Application No. 61/090,557, filed on Aug. 20, 2008, the disclosure of which is hereby expressly incorporated by reference. This application is related to U.S. patent application Ser. No. 12/544,991, filed on Aug. 20, 2009, which claims the benefit of U.S. Provisional Application No. 61/090,503, filed on Aug. 20, 2008.

BACKGROUND

Typical cables include a conductor, such as a number of copper or aluminum strands, surrounded by an insulation layer. In some instances, the life span of a cable is shortened when water enters the cable and forms micro-voids in the insulation layer around ionic contaminants. These micro-voids spread throughout the insulation layer in a tree like shape, collections of which are sometimes referred to as water trees.

Water trees are known to form in the insulation layer of electrical cables when medium or high voltage is applied to the cable in the presence of water and ions. As water trees grow, they compromise the dielectric properties of the insulation layer until failure occurs. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of a dielectric enhancement fluid into interstices located between the strands of the cable. However, when a dielectric enhancement fluid, or any other fluid such as strand blocking fluid, etc., is injected into the cable, it can leak from the cable, particularly during heat cycling. In that regard, during heat cycling, the insulation layer becomes soft and releases its tension on sealing devices, such as O-ring seals, in the cable connection assembly. As the tension is released, the seals may fail and allow dielectric enhancement fluid to leak from the cable.

Accordingly, there exists a need for cable connection assemblies having improved seals to decrease leak points of injected fluid from the insulation layer. Such improved seals may also decrease water entry points into the cable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a cable termination connection assembly for coupling a cable to an apparatus is provided. The cable connection assembly generally includes a main body defining an inner cavity having first and second ends, the main body configured to receive a pressurized fluid, and the first end configured to receive at least a portion of the cable therein, and a first engagement mechanism configured to couple the main body to the cable, wherein the first engagement mechanism includes a first adhesive seal.

In accordance with another embodiment of the present disclosure, a cable termination connection assembly for coupling a cable to an apparatus is provided. The cable connection assembly generally includes a main body defining an inner cavity adapted to receive a pressurized fluid and at least a portion of the cable therein. The cable connection assembly further includes a threaded portion disposed on a first end of the main body for coupling the main body to the cable, and a first inlet port for delivering adhesive to the threaded portion.

In accordance with another embodiment of the present disclosure, a method for coupling a cable to an apparatus is provided. The method generally includes providing a cable connection assembly including a main body defining an inner cavity having a first end and a second end, the inner cavity adapted to receive a pressurized fluid and at least a portion of a cable therein. The method further includes providing the cable having a first end, inserting the first end of the cable into a first engagement mechanism at the first end of the inner cavity of the main body, and sealing the first end of the cable in the first end of the inner cavity of the main body using an adhesive.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Figure 1:
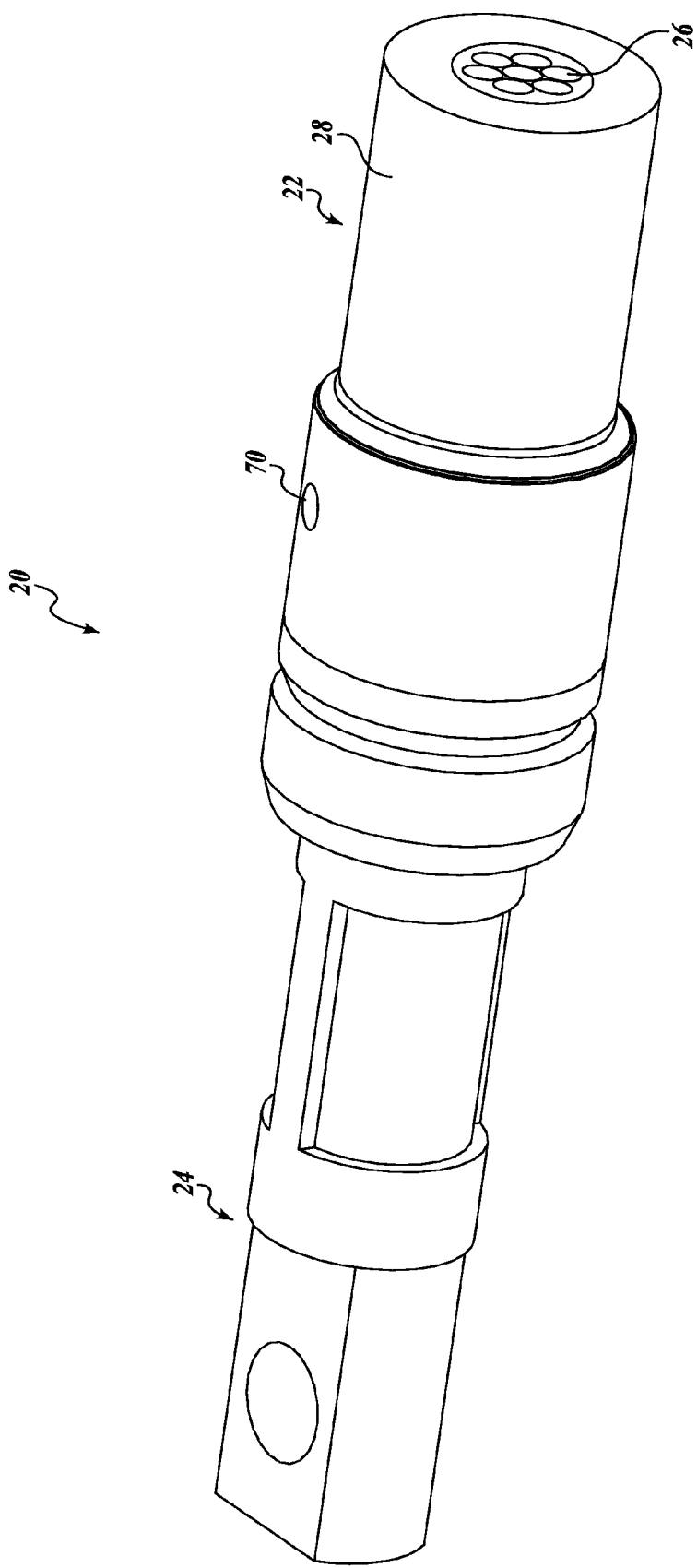
FIG. 1 is a perspective view of one embodiment of a cable termination connection assembly formed in accordance with the present disclosure.
Figure 2:
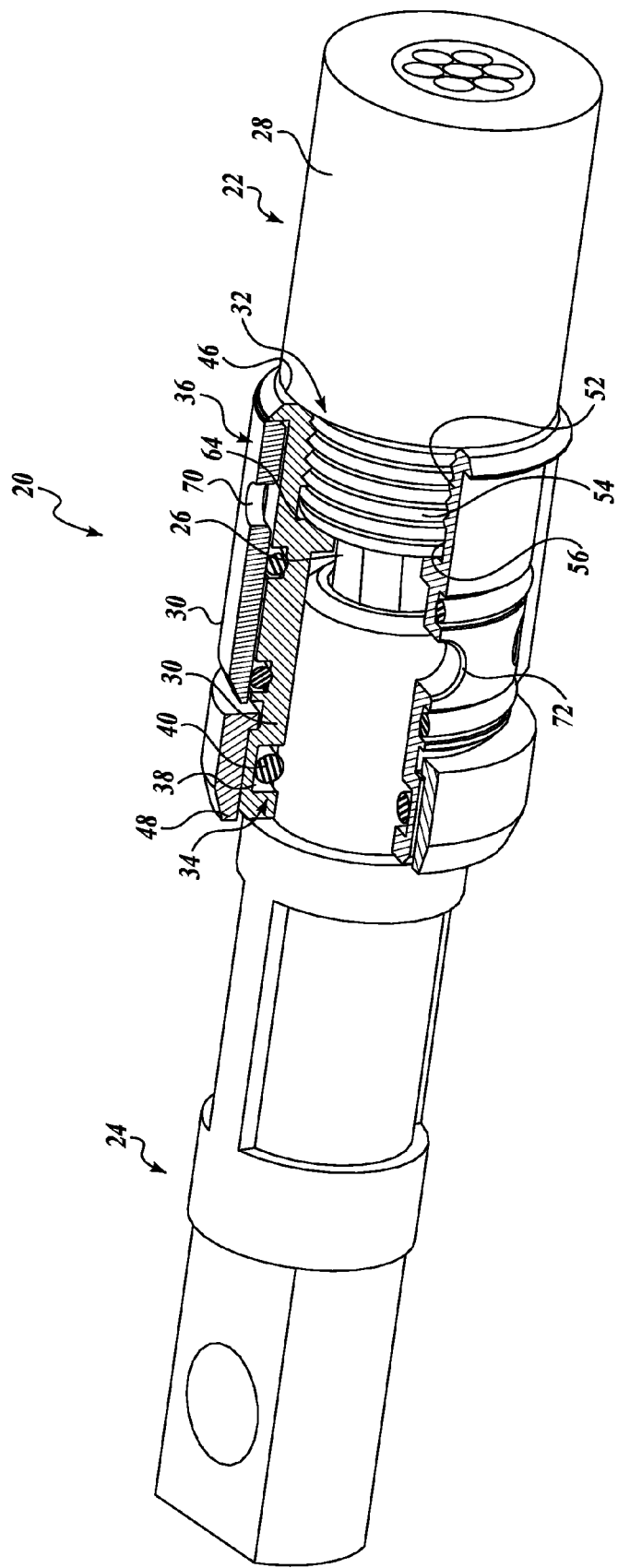
FIG. 2 is a perspective, partial cut-away view of the cable termination connection assembly of FIG. 1, having sealing mechanisms formed in accordance with one embodiment of the present disclosure.
Figure 3:
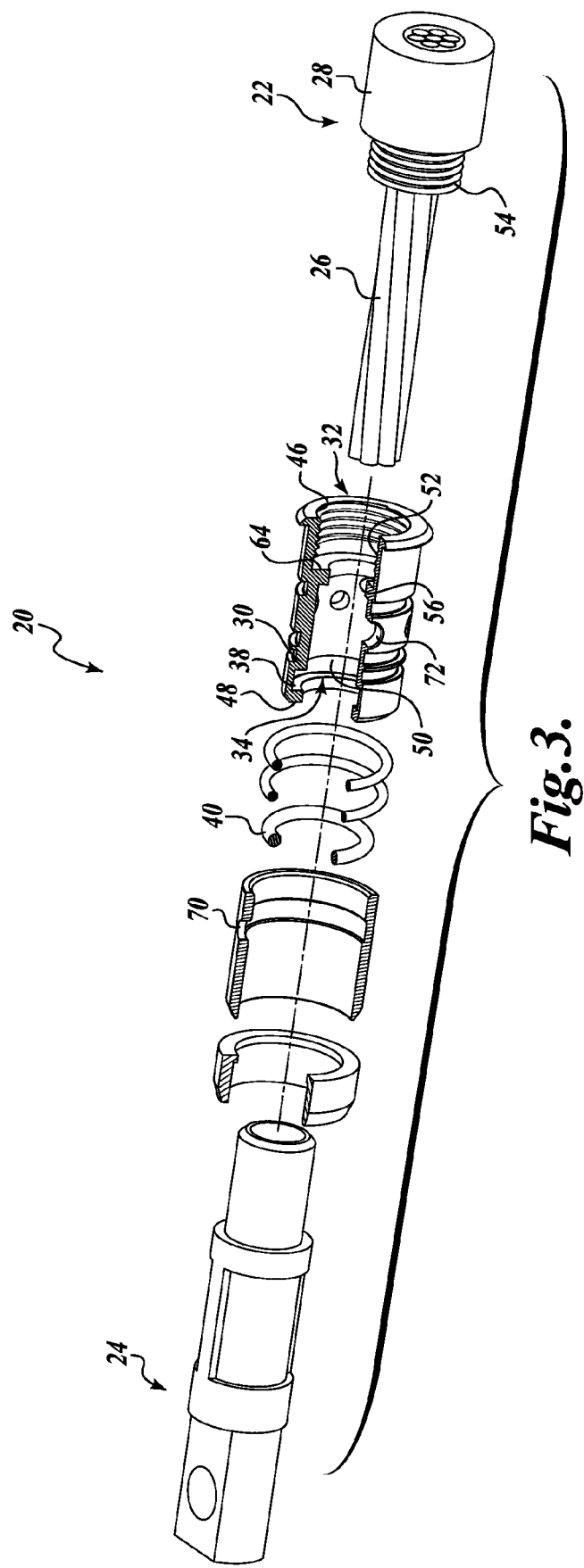
FIG. 3 is an exploded, partial cut-away view of the cable termination connection assembly of FIG. 1.

Referring to FIGS. 1-3, one embodiment of a cable termination connection assembly 20 formed in accordance with the present disclosure is shown. Generally described, the cable connection assembly 20 is adapted to couple a cable 22 to an apparatus 24 while permitting a fluid, one suitable example being a restorative fluid, such as a dielectric enhancement fluid, to be injected into the cable 22.

The cable 22 may be any well known or to be developed cable, such as the cable 22 illustrated, having a plurality of conductors 26 surrounded by an insulation layer 28. The insulation layer 28 may include layers of materials to accommodate electrical stress grading and shielding, as desired. The apparatus 24 may be any well known or to-be-developed component requiring connection to the cable 22, a few suitable examples being a termination connector, such as shown, for connecting the cable 22 to a device requiring to be in electrical communication with the cable 22, such as a junction box, transformer, etc.

Still referring to FIGS. 1-3, the cable connection assembly 20 includes a main body 30 for coupling the cable 22 to the apparatus 24. The main body 30 includes first and second open ends 46 and 48. At least a portion of the first end of the cable 22 is receivable within the first open end 46 of the main body 30 and at least a portion of the first end of the apparatus 24 is receivable within the second open end 48 of the main body 30. As described in greater detail below, the first and second open ends 46 and 48 may include respective sealing mechanisms for minimizing fluid leakage, as well as for preventing water ingress into the connection assembly 20.

The main body 30 is suitably a cylindrically shaped structure, such as a collar, defining an inner cavity 50 (see FIG. 3). The inner cavity 50 may be sized and shaped to receive at least a portion of the cable 22 and at least a portion of the apparatus 24. Further, the inner cavity 50 is adapted to receive the fluid mentioned above for treating the cable 22, as described in greater detail below. In that regard, the cable connection assembly 20 further includes a valve assembly 36 for receiving and delivering fluid to the cable 22, which will be described in greater detail below.

The engagement of the cable 22 at the first open end 46 of the main body 30 will now be described in greater detail. In that regard, the main body includes a first engagement mechanism 32 for releasably engaging the cable 22 in the first end 46 of the main body 30. In the illustrated embodiment, the first engagement mechanism 32 includes a threaded portion or threaded bore 52 that has internal threads disposed upon an inner surface of the main body 30. The threaded bore 52 is configured to engage corresponding threads 54 disposed on an external surface of the insulation layer 28 of the cable 22.

Although the first engagement mechanism 32 is illustrated and described as utilizing threads to couple the cable connection assembly 20 to the cable 22, the engagement mechanism 32 may use various other means for coupling the cable connection assembly 20 to the cable 22, a few suitable non-limiting examples being mechanical fasteners, self tapping threads, push on style barbed fittings, ferrule style connectors, quick-to-connect devices, crimping devices, and adhesives that are capable of holding cable 22 in contact with main body 30.

The first engagement mechanism 32 also includes a sealing mechanism. Specifically, an adhesive (not shown) is applied to the threaded connection to form a fluid-tight seal between the main body 30 and the insulation layer 28 when the adhesive cures. In that regard, the threaded bore 52 of the main body 30 may include an annular groove 56 at the end of the threaded bore 52 for containing any excess adhesive that might pool in the main body 30. Rather than an annular groove 56, the main body 30 may also include a partial annular groove, a thread, or a roughened surface having increased surface area for improved adhesion and/or for containing any excess adhesive that might pool in the main body 30.

The adhesive may be applied to either or both of the threaded bore 52 or on the threaded external surface 54 of the insulation layer 28 of the cable 22 before the cable 22 and the main body 30 are coupled to one another. Moreover, the adhesive may be applied (or reapplied) after the cable 22 and the main body 30 have been coupled to one another, for example, through an adhesive inlet port 890 in the main body 830 (see, e.g., FIG. 8).

In another non-limiting example the adhesive may be used as both the engagement mechanism 32 and the sealing mechanism. In this example, the bore 52 and the external surface 54 of the insulation layer 28 of the cable 22 would not be threaded, but may include roughened sealing surfaces to improve the engagement and sealing capabilities of the adhesive.

Figure 9:
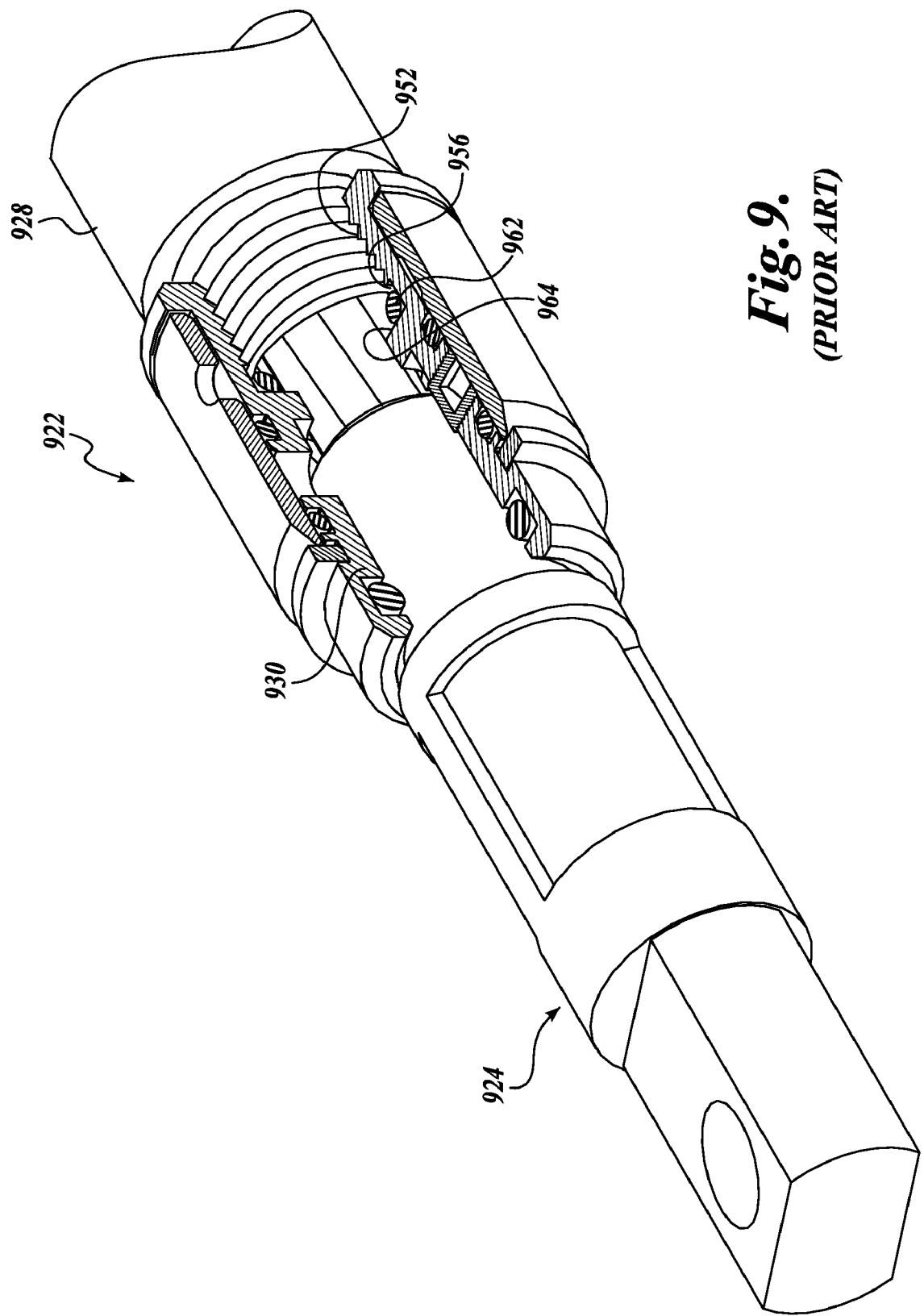
FIG. 9 is a perspective, partial cut-away view of a prior art cable termination connection assembly.

In prior art designs (see FIG. 9) an O-ring seal 962 was positioned in an annular groove 956 at the end of the threaded bore 952 to form a fluid-tight seal between the main body 930 and the insulation layer 928. When threaded to the main body 930, the insulation layer 928 put compression on the seal 962 to sandwich the seal 962 against annular shoulder 964 of threaded bore 952. During heat cycling, however, the insulation layer 928 can become soft and release its compression on seal 962. As the compression is released, the seal 962 may fail and allow dielectric enhancement fluid to leak from the cable 922.

To address this problem with prior art designs, the adhesive seal of the present disclosure maintains a reliable seal between the insulation layer 28 and the main body 30, particularly during heat cycling. In that regard, the adhesive seal fills in gaps between the threads of both the main body 30 and the insulation layer 28 to provide enhanced mechanical strength to the first engagement mechanism 32. Specifically, the adhesive seal can be maintained during dynamic changes, such as thermal changes, as a result of the gap filling properties of the adhesive. In addition to an adhesive seal, it should be appreciated the first engagement mechanism 32 may or may not include an additional seal, such as an O-ring seal, sandwiched between the insulation layer 28 and annular shoulder 64 of threaded bore 52.

Any suitable adhesive now known or to be developed for forming a fluid tight seal between the main body 30 and the insulation layer 28 may be used. The adhesive is designed to fill the gaps between the main body 30 and the insulation layer 28 to provide enhanced mechanical strength to the first engagement mechanism 32. In a preferable embodiment, the adhesive has heat resistance of at least 130 degrees Celsius, so that the adhesive will hold its mechanical strength during heat cycling. In another embodiment, the adhesive has suitable water and chemical resistance, as well as suitable bond strength required for the application.

In a non-limiting example, the adhesive is a curing adhesive. In other non-limiting examples, the adhesive is selected from the following groups of adhesives: acrylic, epoxy, structural, temperature resistant, thermosetting, etc. In yet another non-limiting example, the adhesive is a structural adhesive, for example, made by 3M™ under the brand name SCOTCH-WELD™, such as an acrylic structural plastic adhesive under the brand name 3M™ DP8005 and a curing flexible epoxy resin system under the brand name RELTEK™ BONDIT™ B-45TH.

It should be appreciated that the specific type of adhesive used may depend on the construction of the cable 22. For example, in one embodiment of the present disclosure, the cable insulation layer 28 is made from polyethylene, and the adhesive is any suitable adhesive cable of bonding to a polyethylene. In other embodiments of the present disclosure, the cable insulation layer 28 may be made from ethylene propylene rubber, polyvinyl chloride, etc. In those embodiments, the adhesive is any suitable adhesive capable of bonding to the various materials.

The engagement of the apparatus 24 at the second open end 48 of the main body 30 will now be described in greater detail. The second engagement mechanism 34 is configured to engage the second end 48 of the main body 30 with the first end of the apparatus 24. This engagement may be releasable or non-releasable. In the illustrated embodiment, the second engagement mechanism 34 is merely formed by inserting the first end of the apparatus 24 into the second open end 48 of the main body 30. This method of engagement allows the connection assembly 20 to move relative to the apparatus 24 during heat cycling and thermal and mechanical expansions and contractions of the insulation and to minimize stress build-up in the cable 22 of the connection assembly 20.

Although the second engagement mechanism 34 is illustrated and described as a slidable engagement, it should be appreciated that the second engagement mechanism 34 may be a more rigid engagement. In that regard, the second engagement mechanism 34 may include, for example, one or more fasteners (not shown), such as set screws, which pass radially through the main body 30 to fixedly couple the connection assembly 20 to the apparatus 24. The fasteners can be designed to engage the apparatus 24, thereby mechanically and electrically coupling or locking the apparatus 24 to the main body 30. It should be apparent to one of ordinary skill that other types of engagement mechanisms, such as threads disposed on the main body 30, adhesives, quick-to-connect devices, crimping devices, self-locking retaining rings, welding, and adhesives, are also within the scope of the present disclosure.

In the illustrated embodiment, the second engagement mechanism 34 includes a second sealing mechanism. In the illustrated embodiment, the second sealing mechanism includes an annular groove 56 formed on the interior of the main body 30 near the first end of the main body 30. The annular groove 56 may be sized and configured to at least partially receive a seal 40, such as an O-ring seal, to sandwich the seal against the apparatus 24 and seal the main body 30 to the apparatus 24. The O-ring 40 is disposed between the interior of the main body 30 and the exterior of the apparatus 24 to form a fluid tight seal therebetween. It should be appreciated that the annular groove 56 may be formed on either of the interior of the main body 30 or the exterior of the apparatus 24.

It should be apparent that the main body 30 may be sealed to the apparatus 24 in any number of ways, including a plurality of grooves and O-rings, gaskets, a seal disposed against an end face of the apparatus 24, threading of the main body 30 upon the apparatus, liquid gasket compounds, etc. These various seals may be positioned on either the apparatus 24 or on the main body 30.

The second sealing mechanism may also include an adhesive to also provide enhanced mechanical strength to the second sealing mechanism, for example, during heat cycling. The adhesive may be applied to the inner cavity 50 of the second end 48 of the main body 30 near and/or in the annular groove 56 before the apparatus 24 and the main body 30 are coupled to one another. Moreover, the adhesive may be applied (or reapplied) after the apparatus 24 and the main body 30 have been coupled to one another, for example, through an adhesive inlet port 580 in the main body 530 (see, e.g., FIG. 5). It should be appreciated that the adhesive will provide a mechanical connection between the main body 30 and the apparatus 24.

The valve assembly 36 is configured to allow a fluid, one suitable example being a restorative fluid, such as a dielectric enhancement fluid, to be injected into the cable 22. In that regard, the valve assembly 36 may include one or more inlet ports 70 and 72. The inlet ports 70 and 72 may pass through an external collar 74 surrounding the main body 30. When the inlet ports 70 and 72 are aligned, they permit fluid to pass into the inner cavity 50 of the main body 30, for example, in a radial direction.

Various valve assemblies are known in the art. In one suitable embodiment, the valve assembly 36 of the present disclosure may be substantially similar to the valve assembly described in U.S. Pat. No. 7,344,396, filed on Aug. 23, 2005, entitled "Cable Connection Assembly," the disclosure of which is hereby expressly incorporated by reference. Thus, for the sake of brevity, the valve assembly 36 will not hereinafter be described in detail.

In light of the above description of the components of the cable connection assembly 20, a method for coupling a cable 22 to an apparatus 24 using the cable connection assembly 20 will now be described. Referring to FIG. 3, prior to installation, the insulation layer 28 of the cable 22 may be cut back exposing the conductors 26. The insulation layer 28 may then be threaded to form external threads 54 sized and shaped to interface with the threaded bore 52 of the main body 30. The main body 30 is then attached by being threaded onto the first end of the cable 22. As discussed above, adhesive is applied to the threaded connection either before or after the first end of the cable 22 is inserted into the inner cavity 50 of the main body 30. The adhesive may also be applied to the threaded connection both before and after the first end of the cable 22 is inserted into the inner cavity 50 of the main body 30.

The first end of the apparatus 24 may then be inserted into the inner cavity 50 of the main body 30 so that the conductors 26 of the cable 22 extend into the apparatus 24. The apparatus 24 may then be crimped upon the conductors 26 to retain the apparatus 24 to the cable 22. Fasteners (not shown) can be driven to engage the apparatus 24 to mechanically couple the cable connection assembly 20 to the apparatus 24. As discussed above, adhesive may be applied to the seal assembly in the second end 48 of the inner cavity 50 either before or after the first end of the apparatus 24 is inserted into the inner cavity 50 of the main body 30.

A restorative fluid may be injected through the injection port 70 to pass through the fluid passageway 72 and enter the inner cavity 50.

Referring to FIGS. 4-8, alternate embodiments of cable connection assemblies formed in accordance with the present disclosure are illustrated. The cable connection assemblies of these alternate embodiments is substantially similar in construction and operation to the cable connection assembly 20 of FIGS. 1-3 described above. Therefore, for the sake of brevity, this detailed description will focus upon the aspects of the cable connection assemblies of FIGS. 4-8 which depart from the previously described embodiment in the construction and operation of the first and second engagement mechanisms.

Figure 4:
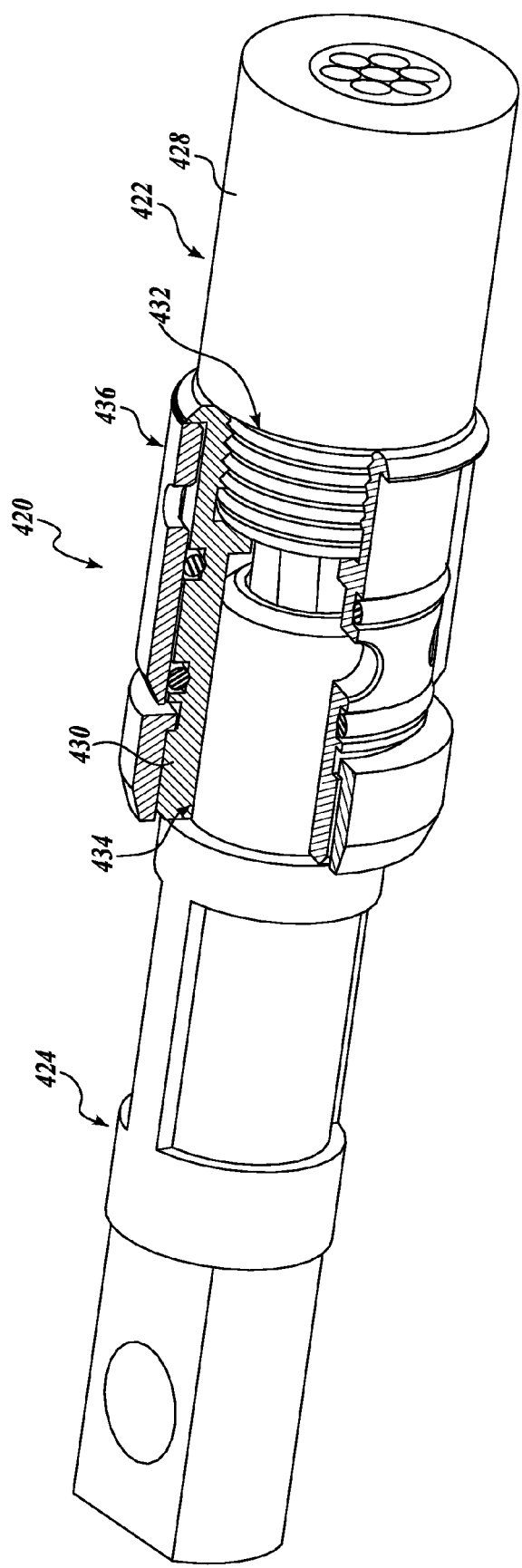
FIG. 4 is a perspective, partial cut-away view of a second embodiment of a cable termination connection assembly formed in accordance with the present disclosure, having sealing mechanisms formed in accordance with a second embodiment of the present disclosure.

FIG. 4 depicts a second embodiment of a cable connection assembly 420 shown in partial cross-section. The cable connection assembly 420 is substantially identical to the cable connection assembly 20 described above with reference to FIGS. 1-3 except for the differences hereinafter described with reference to the second engagement mechanism 434. The second engagement mechanism 434 does not include an interior annular groove for receiving an O-ring. Rather, a suitable adhesive is applied to the exterior of the apparatus 424 and/or the interior of the main body 430 to form a seal therebetween when main body 430 is received on the apparatus 424 and the adhesive cures. It should be appreciated that either the inner surface of the main body 430 or the outer surface of the apparatus 424 may include a roughened surface having increased surface area. As described above, any suitable adhesive now known or to be developed for forming a fluid tight seal between the main body 430 and the apparatus 424 may be used.

Figure 5:
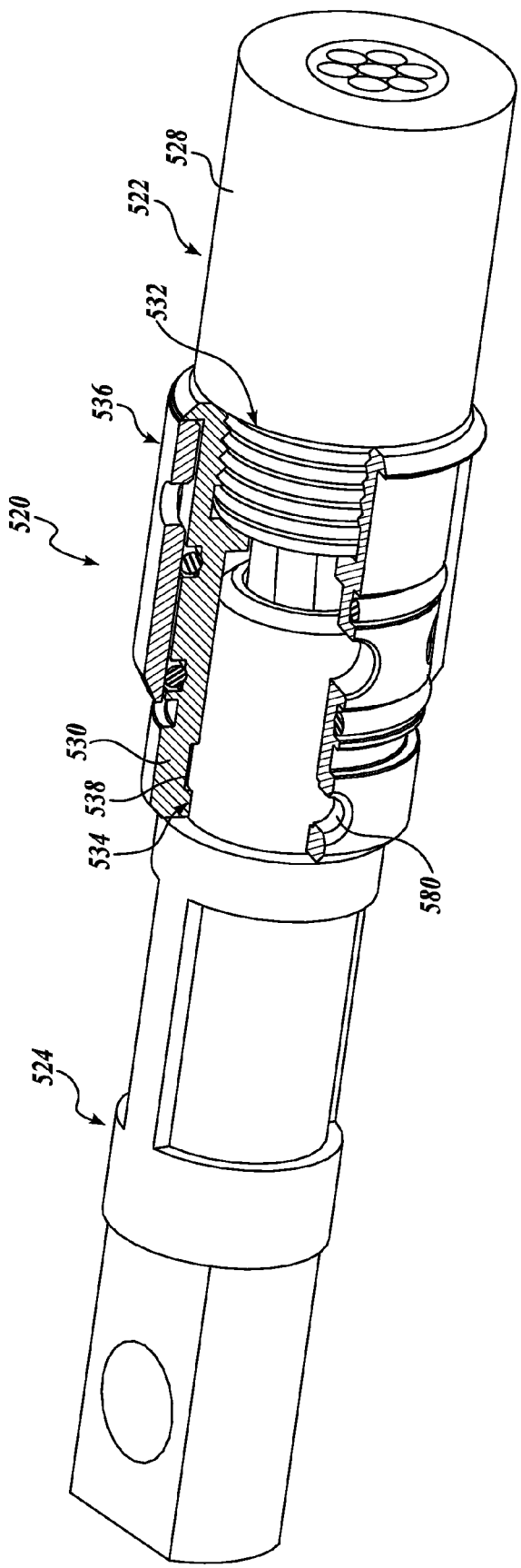
FIG. 5 is a perspective, partial cut-away view of a third embodiment of a cable termination connection assembly formed in accordance with the present disclosure, having sealing mechanisms formed in accordance with a third embodiment of the present disclosure.

FIG. 5 depicts a third embodiment of a cable connection assembly 520 shown in partial cross-section. The cable connection assembly 520 is substantially identical to the cable connection assembly 420 described above with reference to FIG. 4 except for the differences hereinafter described with reference to the second sealing mechanism 534. The second sealing mechanism 534 includes an inlet port 580 formed in the main body 530 near the first end of the main body 530. A first annular groove 538 is formed on the interior of the main body 530 in alignment with the inlet port 580. An adhesive can be injected into the inlet port 580 to spread around the interior circumference of the main body 530 through the first annular groove 538 to form a seal between the interior of the main body 530 and the exterior of the apparatus 524. Rather than an annular groove 538, the main body 530 may also include a partial annular groove, a thread, or a roughened surface having increased surface area.

Figure 6:
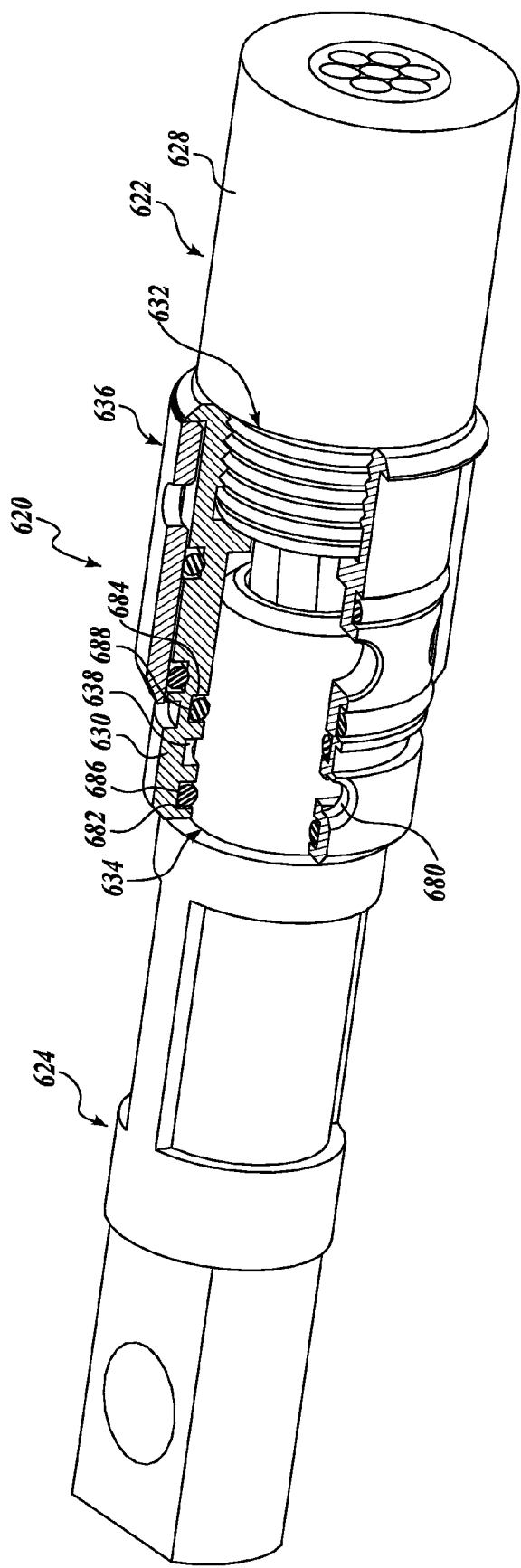
FIG. 6 is a perspective, partial cut-away view of a fourth embodiment of a cable termination connection assembly formed in accordance with the present disclosure, having sealing mechanisms formed in accordance with a fourth embodiment of the present disclosure.

FIG. 6 depicts a fourth embodiment of a cable connection assembly 620 shown in partial cross-section. The cable connection assembly 620 is substantially similar to the cable connection assembly 520 described above with reference to FIG. 5 except for the differences hereinafter described with reference to the second sealing mechanism 634. The second sealing mechanism 634 includes second and third annular grooves 682 and 684 formed on the interior of the main body 630 on each side of a first annular groove 638. O-rings 686 and 688 are received within the second and third annular grooves 682 and 684 to form an annular sealed region around the first annular groove 638. As such, when adhesive is injected into the inlet port 680, the adhesive does not spread axially along the interior of the main body 630 past the O-rings 686 and 688 received within the second and third annular grooves 682 and 684.

Figure 7:
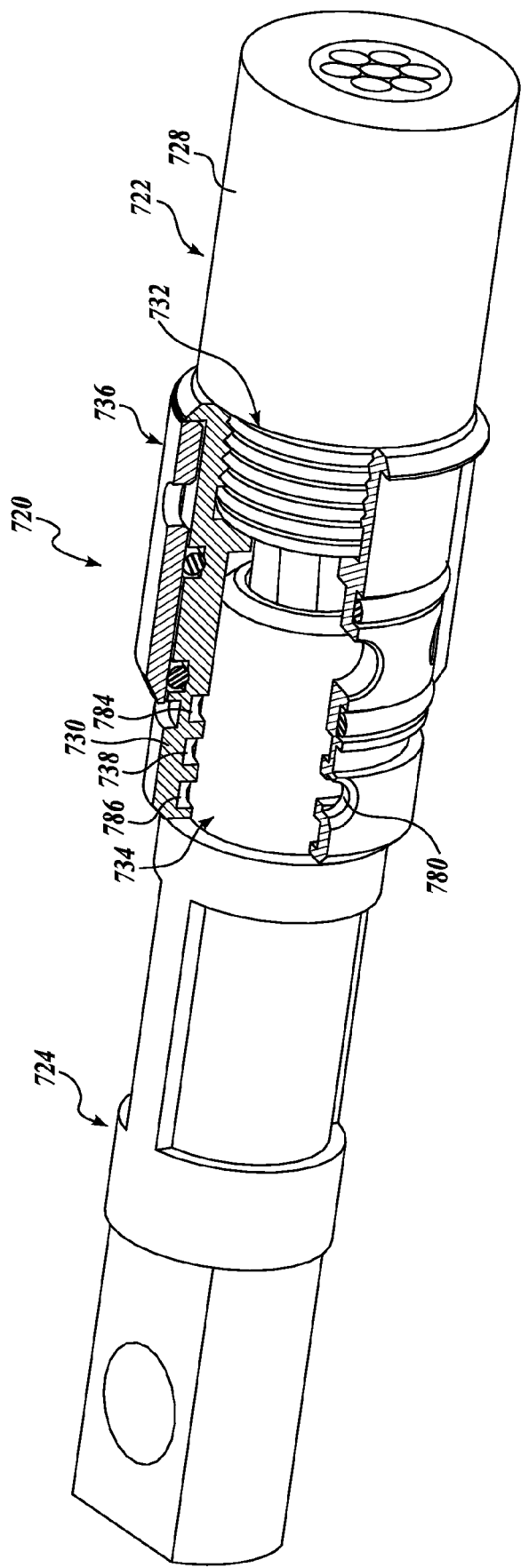
FIG. 7 is a perspective, partial cut-away view of a fifth embodiment of a cable termination connection assembly formed in accordance with the present disclosure, having sealing mechanisms formed in accordance with a fifth embodiment of the present disclosure.

FIG. 7 depicts a fifth embodiment of a cable connection assembly 720 shown in partial cross-section. The cable connection assembly 720 is substantially identical to the cable connection assembly 620 described above with reference to FIG. 6 except for the differences hereinafter described with reference to the second sealing mechanism 734. Second and third annular grooves 784 and 786 are formed on the interior of the main body 730 on each side of the first annular groove 738. However, the second and third annular grooves do not receive O-rings therein. Rather, the second and third annular grooves 784 and 786 act as overflow/venting channels for the adhesive when it is injected into the inlet port 780 and it travels within the first annular groove 738. Instead of annular grooves 784 and 786, the main body 730 may also include partial annular grooves, threads, or roughened surfaces having increased surface areas.

Figure 8:
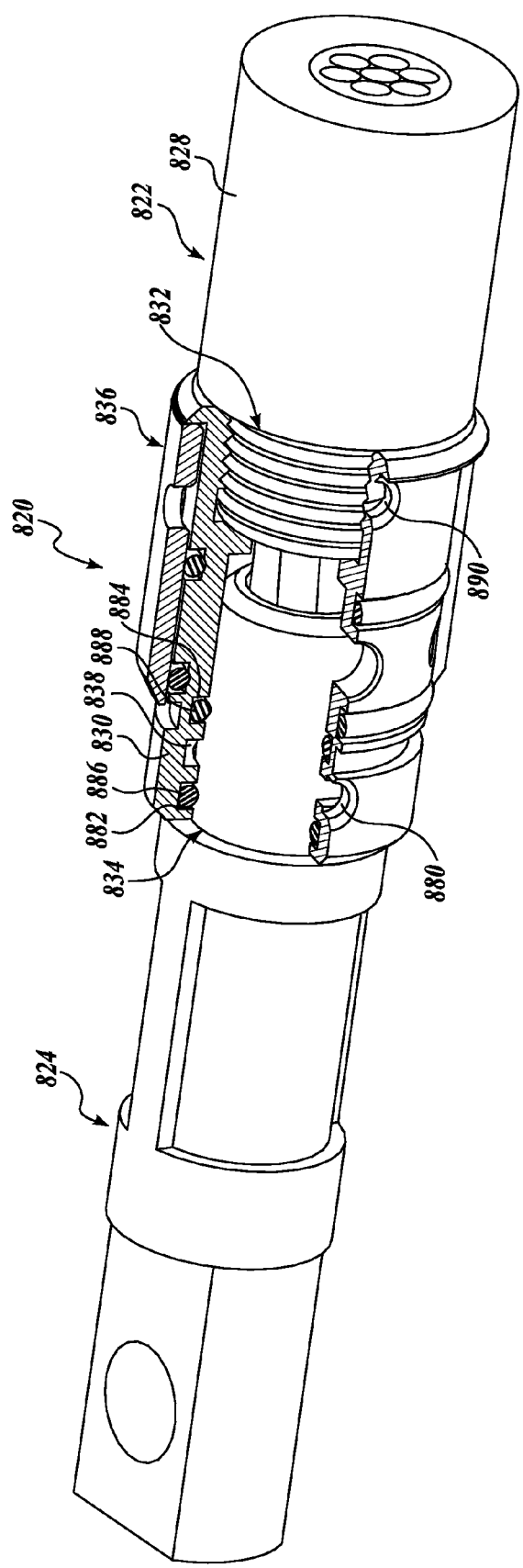
FIG. 8 is a perspective, partial cut-away view of a sixth embodiment of a cable termination connection assembly formed in accordance with the present disclosure, having sealing mechanisms formed in accordance with a sixth embodiment of the present disclosure.

FIG. 8 depicts a sixth embodiment of a cable connection assembly 820 shown in partial cross-section. The cable connection assembly 820 is substantially identical to the cable connection assembly 620 described above with reference to FIG. 6 except for the differences hereinafter described with reference to the first sealing mechanism 832. The main body 830 includes a second inlet port 890 formed near the first end of the main body 830. An adhesive is injected into the second inlet port 890 to seal the threaded connection between the insulation layer 828 and the main body 830 when the adhesive cures.

In accordance with the embodiments described herein, a plurality of small through holes (not shown) may be formed within the main body of any of the cable connection assemblies described above for allowing venting and necessary bleed out of the adhesive when it is injected within an injection through hole. The holes may be spaced radially around the main body to provide a visual indicator that the adhesive has spread around the entire inner circumference of the main body when the adhesive bleeds out of the holes.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A cable termination connection assembly for coupling a cable to an apparatus, the cable having an outer circumference, the cable connection assembly comprising:
   (a) a main body defining an inner cavity having an inner circumference and first and second ends, the main body configured to receive a pressurized fluid, and the first end configured to receive at least a portion of the cable therein; and
   (b) a first engagement mechanism configured to couple the main body to the cable, wherein the first engagement mechanism includes a first adhesive seal bonded to both a surface of the cable and a surface of the main body, wherein the first adhesive seal extends around the entire outer circumference of the cable and the entire inner circumference of the main body to prevent fluids from passing between the cable and the main body at the adhesive seal.

2. The assembly of claim 1, wherein the first engagement mechanism is adapted to releasably couple the main body to the cable.

3. The assembly of claim 1, wherein the first engagement mechanism includes a threaded bore in the first end of the inner cavity to engage corresponding threads disposed on an exterior surface of the cable.

4. The assembly of claim 3, wherein the first adhesive seal is between the threaded bore and the corresponding threads disposed on the exterior surface of the cable.

5. The cable connection assembly of claim 1, wherein the threaded bore includes an annular groove.

6. The assembly of claim 1, wherein the adhesive of the first adhesive seal is selected from the group consisting of acrylic, epoxy, structural, temperature resistant, thermosetting adhesives.

7. The assembly of claim 1, further comprising a second engagement mechanism for coupling the main body to the apparatus, wherein the second engagement mechanism includes a second seal.

8. The assembly of claim 7, wherein the second seal includes a second adhesive seal.

9. The assembly of claim 8, wherein the adhesive of the second adhesive seal is selected from the group consisting of acrylic, epoxy, structural, temperature resistant, thermosetting adhesives.

10. The assembly of claim 7, wherein the second seal includes at least one annular groove in the second end of the inner cavity.

11. The assembly of claim 10, wherein the second seal includes at least one O-ring seal disposed in the at least one annular groove.

12. The assembly of claim 7, wherein the second seal includes at least two annular grooves in the second end of the inner cavity.

13. The assembly of claim 7, wherein the second seal includes at least three annular grooves in the second end of the inner cavity.

14. The assembly of claim 1, further comprising a valve assembly for delivering fluid to the main body and the cable.

15. The assembly of claim 1, further comprising a first inlet port for delivering adhesive to the first engagement mechanism.

16. The assembly of claim 7, further comprising a second inlet port for delivering adhesive to the second engagement mechanism.

17. A method for coupling a cable to an apparatus, the method comprising:
 (a) providing a cable connection assembly including a main body defining an inner cavity having an inner circumference and a first end and a second end, the inner cavity adapted to receive a pressurized fluid and at least a portion of a cable therein;
 (b) providing the cable having an outer circumference, the cable having a first end;
 (c) inserting the first end of the cable into a first engagement mechanism at the first end of the inner cavity of the main body; and
 (d) sealing the first end of the cable in the first end of the inner cavity of the main body using an adhesive, wherein the adhesive bonds to a surface of the first end of the cable and a surface of the inner cavity of the main body, and wherein the first adhesive seal extends around the entire outer circumference of the cable and the entire inner circumference of the main body to prevent fluids from passing between the cable and the main body at the adhesive seal.

18. The method of claim 17, further comprising applying an adhesive to at least one of the first end of the inner cavity or the first end of the cable before inserting the first end of the cable into the first end of the inner cavity.

19. The method of claim 17, further comprising applying an adhesive to at least one of the first end of the inner cavity or the first end of the cable after inserting the first end of the cable into the first end of the inner cavity.

20. The method of claim 17, further comprising providing an apparatus, inserting the first end of the apparatus in the second end of the inner cavity, and sealing the first end of the apparatus in the second end of the inner cavity of the main body using an adhesive.

21. The method of claim 20, further comprising applying an adhesive to at least one of the second end of the inner cavity or the first end of the apparatus before inserting the first end of the apparatus into the second end of the inner cavity.

22. The method of claim 20, further comprising applying an adhesive to at least one of the second end of the inner cavity or the first end of the apparatus after inserting the first end of the apparatus into the second end of the inner cavity.

* * * * *